J. A. RISHEL.
SADDLE BLOCK FOR SCALES.
APPLICATION FILED AUG. 10, 1908.
918,913.
Patented Apr. 20, 1909.
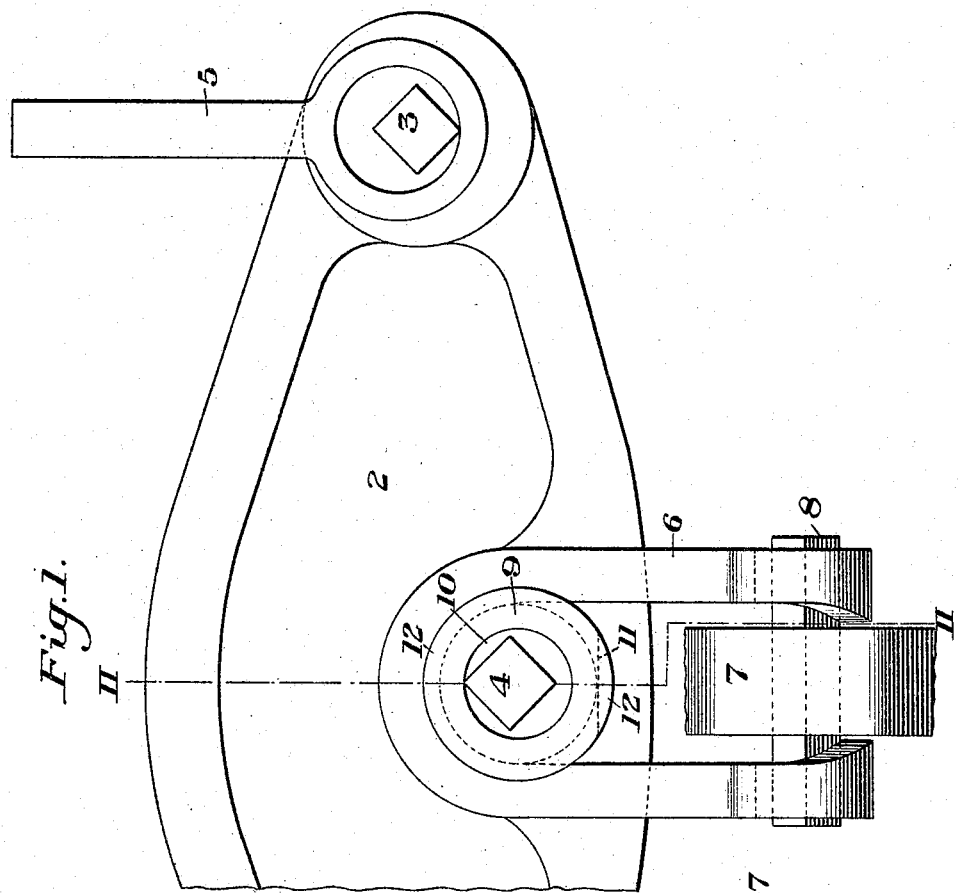
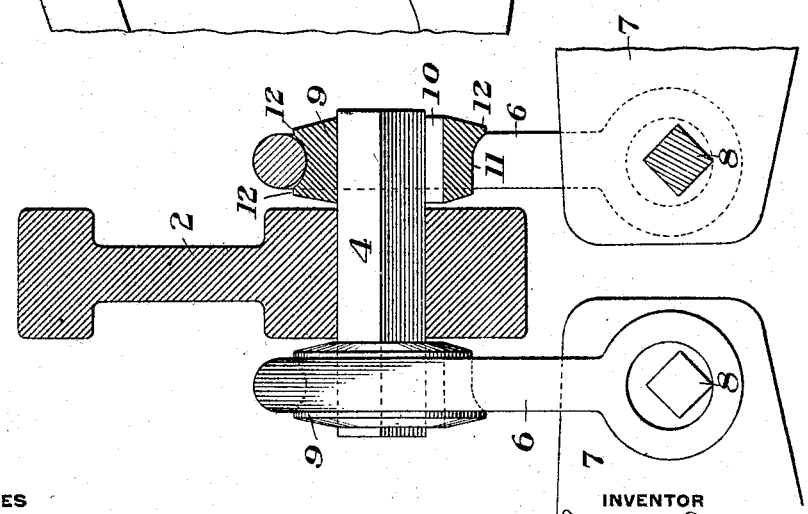
WITNESSES
R H Balderson.
W.W. Swartz.
INVENTOR
Jno. A. Rishel,
by Bakewell, Byrnes & Parmelee
his Attys

UNITED STATES PATENT OFFICE.

JOHN A. RISHEL, OF MUNHALL, PENNSYLVANIA.

SADDLE-BLOCK FOR SCALES.

No. 918,913.  Specification of Letters Patent.  Patented April 20, 1909.

Application filed August 10, 1908. Serial No. 447,684.

*To all whom it may concern:*

Be it known that I, JOHN A. RISHEL, of Munhall, Allegheny county, Pennsylvania, have invented a new and useful Improvement in Saddle-Blocks for Scales, of which the following is a full, clear, and exact description, reference being had to the accompanying drawings, forming part of this specification, in which—

Figure 1 is a side elevation of a scale beam showing my improved saddle block applied for use on the scale beam; Fig. 2 is a sectional end elevation of the scale beam taken on the line II—II of Fig. 1.

My invention relates to weighing scales and it particularly relates to track platform scales employed in weighing cars containing heavy loads, although the invention is adapted for use with small scales of similar construction.

The object of the invention is to provide an improved saddle block for such scales by the use of which disarrangement of the parts which cause the scales to weigh incorrectly will be prevented and by the use of which the parts are easily and quickly put in place in assembling or repairing the scales.

The invention consists in a saddle block having a bearing face which will always be in the proper position relative to the loop in which the saddle block is placed and which is of circular form and which contacts with the knife edge coacting with the saddle block.

In the drawings, 2 represents a scale beam having knife edges 3 and 4. The knife edge 3 coöperates with the eye of the pin 5, which is fixed to the foundation of the scale in any desired manner to form a fulcrum for this beam. Loops 6 are used to connect the beam 2 to the cross beams 7, 7, the ends of the loops 6 being secured on the knife edges 8 which are secured in the ends of the beams 7. The loops 6 extend upwardly around the knife edges 4 in the beam 2 and in each of the loops 6 is my improved saddle block 9. The saddle blocks are cylindrical and are provided with the cylindrical openings 10, in which the opposite ends of the knife edges 4 are inserted. The outer edge of the cylindrical saddle block 9 is grooved so that the curved upper end of the loop 6 will bear on the edge of the saddle block and is also provided with a flattened portion 11 on one edge, which extends preferably in a substantially horizontal plane when in position in the loop. In placing the saddle blocks in the loops, the flattened portions 11 extend in a vertical plane, the cut-away portion of the shoulder 12 permitting the block 9 to be inserted in the loop, when by giving the saddle block a quarter turn in the loop, the shoulders 12, 12 engage with the loop 6 and serve to retain the saddle block in place.

It will be noted that owing to the cylindrical bearing face of the opening 10 in the saddle block 9, the distance between the bearing points of the loop which contact with the knife edges 4 and 8 is always the same, no matter what the position of the saddle block in the loop 6. Heretofore with such loops, the saddle block has been constructed in such manner that jarring of the scale would frequently displace the saddle block from its seat in the loop and in this way change the distance between the bearing face in the saddle block and the bearing face of the bottom portion of the loop and disarrange the scale mechanism, causing the scale to weigh incorrectly.

The advantages of my invention are many and will be apparent to those skilled in the art. The saddle block can be easily and cheaply made and by having a continuous curved bearing face on its inner surface instead of the straight face as used on such blocks heretofore, the accuracy of the weighing mechanism is largely increased.

Modifications in the construction and arrangement of the parts may be made without departing from my invention.

I claim:—

1. In a scale mechanism having a U-shaped beam suspending loop, a saddle block having a cylindrical opening therethrough removably secured in said loop, said saddle block having flanges forming a peripheral groove thereon, the diameter of the flanges being greater than the distance between the parallel legs of said loop and the saddle block having a flange with a portion cut away permitting its insertion sidewise in place in said loop, substantially as described.

2. In a scale mechanism having a U-shaped beam suspending loop, a saddle block having a cylindrical opening therethrough removably secured in said loop, said saddle block having flanges forming a peripheral groove thereon, the diameter of the flanges being greater than the distance between the parallel legs of said loop, the saddle block having a flange with a portion cut away permitting its insertion sidewise in place in said loop and being secured in place in the loop by turning the block axially therein, substantially as described.

3. In a scale mechanism having U-shaped beam-suspending loops, a saddle block having a cylindrical opening therein, and a peripheral groove substantially concentric with said opening in the block, the diameter of the bottom of the groove equaling the distance between the parallel legs of the loops, at least one of the flanges forming the groove in the block having a cut-away portion permitting the blocks to be removed and replaced sidewise in said loops; substantially as described.

4. In a scale mechanism having beam suspending loops, a saddle block, a cylindrical opening therethrough, and having flanged outer edges, concentric with the opening, said flanges being arranged to contact with the loop and retain the saddle block in place, at least one of said flanges having a cut away portion adapted to permit the block to be placed in the loop; substantially as described.

In testimony whereof, I have hereunto set my hand.

JOHN A. RISHEL.

Witnesses:
C. H. JEFFERIES,
C. K. BRUYEL.